(12) United States Patent
Martin

(10) Patent No.: US 7,904,393 B2
(45) Date of Patent: Mar. 8, 2011

(54) LAND DESCRIPTION TRACT INDEX

(76) Inventor: Sam B. Martin, Edmond, OK (US)

( * ) Notice: Subject to any disclaimer, the term of this patent is extended or adjusted under 35 U.S.C. 154(b) by 675 days.

(21) Appl. No.: 11/247,559

(22) Filed: Oct. 11, 2005

(65) Prior Publication Data

US 2006/0080131 A1    Apr. 13, 2006

Related U.S. Application Data

(60) Provisional application No. 60/522,531, filed on Oct. 11, 2004.

(51) Int. Cl.
*G06Q 50/00* (2006.01)
(52) U.S. Cl. ...................................................... 705/313
(58) Field of Classification Search ................... 705/1
See application file for complete search history.

(56) References Cited

U.S. PATENT DOCUMENTS

| | | | | |
|---|---|---|---|---|
| 2002/0035432 A1* | 3/2002 | Kubica et al. | ................... | 702/5 |
| 2002/0198736 A1* | 12/2002 | Harrison | ......................... | 705/1 |
| 2003/0036922 A1* | 2/2003 | Fries | ............................. | 705/1 |
| 2003/0140064 A1* | 7/2003 | Klein | ........................ | 707/104.1 |
| 2004/0128313 A1* | 7/2004 | Whyman | ................. | 707/103 R |
| 2005/0102532 A1* | 5/2005 | Johnson et al. | .............. | 713/200 |
| 2006/0041442 A1* | 2/2006 | Moore et al. | .................... | 705/1 |

OTHER PUBLICATIONS

Jan. 7, 2009 memorandum concerning In re Bilski issued by John J. Love, Deputy Commissioner for Patent Examination Policy. http://www.uspto.gov/web/offices/pac/dapp/opla/documents/bilski_guidance_memo.pdf.*
EIC 3600 Search Report.*

* cited by examiner

*Primary Examiner* — Jonathan Ouellette
*Assistant Examiner* — Matthew Sittner
(74) *Attorney, Agent, or Firm* — Martin S. High, P.C.

(57) ABSTRACT

The instant invention is a method of indexing and displaying interests in real property tracts comprising accepting input of real property descriptions, maintaining a database containing interests in real property descriptions, creating an array index representing interests in real property tracts where each index in the array index represents a tract of real property, indexing of the property descriptions in the database to the related indices in the array index, and controlling a visual display device to indicate conflicting and non-conflicting interests in real property tracts.

6 Claims, 10 Drawing Sheets

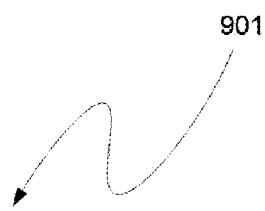
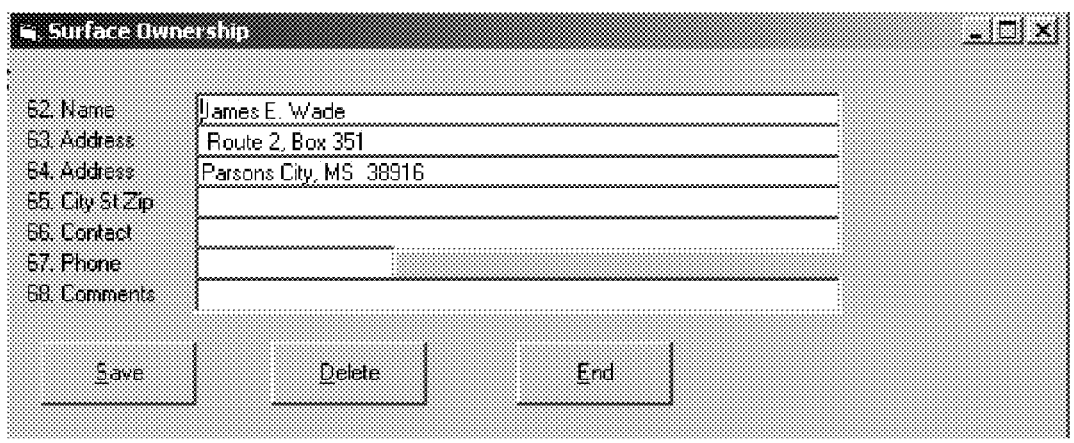
FIG 9

LAND DESCRIPTION TRACT INDEX

CROSS-REFERENCE TO RELATED APPLICATIONS (UNLESS INCLUDED IN THE APPLICATION DATA SHEET)

This application claims priority of the provisional application with Ser. No. 60/522,531 of the same title filed on Oct. 11, 2004. The entire contents of provisional application 60/522,531 are herein incorporated by reference.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM LISTING

Not Applicable.

BACKGROUND OF THE INVENTION

1. Field of Invention

The instant invention pertains to the general field of indexing and tracking real property descriptions to property tracts in order to determine if conflicting real property interests are present and as a method for automatically creating polygons for maps.

2. Description of Prior Art

The historical manner of recording documents for transfer of interests of real property is the ledger method used in land and property offices in court houses throughout the Nation and world. As documents are presented to the land office they are recorded as instruments of conveyance covering the designated land description for that particular piece of real property. As interests change hands the new instruments are recorded at the bottom of the ledger, so this method shows the chronological history of a particular portion of land. Unfortunately, this method makes determining the current status of land difficult, particularly those portions of land where surface rights and subsurface rights have been divided.

BRIEF SUMMARY OF THE INVENTION

The overall purpose of the instant invention is to provide a method for persons determining interest in real property to be able to readily identify parcels of real property that do and do not have conflicting interests in those parcels. For example, investors intending to exploit minerals contained in property require that they have the appropriate rights in the underlying minerals and the ability to access the minerals through necessary surface rights. The instant invention allows such persons to readily ascertain whether such rights exist and whether their rights conflict with the rights of others.

The instant invention is a method of indexing and displaying interests in real property tracts comprising accepting input of real property descriptions, maintaining a database containing interests in real property descriptions, creating an array index representing interests in real property tracts where each index in the array index represents a tract of real property, indexing of the property descriptions in the database to the related indices in the array index, and controlling a visual display device to indicate conflicting and non-conflicting interests in real property tracts.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

BRIEF DESCRIPTION OF THE SEVERAL VIEWS OF THE DRAWINGS

FIG. 6 shows one embodiment of the portion of the instant invention method of accepting real property descriptions and the generation of the array index via accepting a metes and bounds property description also converts full legal descriptions shown in FIG. 8 to brief land calls 601.

FIG. 7 shows one embodiment of the portion of the instant invention method of accepting real property descriptions and accepting real property interest information.

FIG. 9 shows one embodiment of the portion of the instant invention method of accepting the real property surface interest information.

DETAILED DESCRIPTION OF THE INVENTION

Definitions of Terms Used

Figure 1:
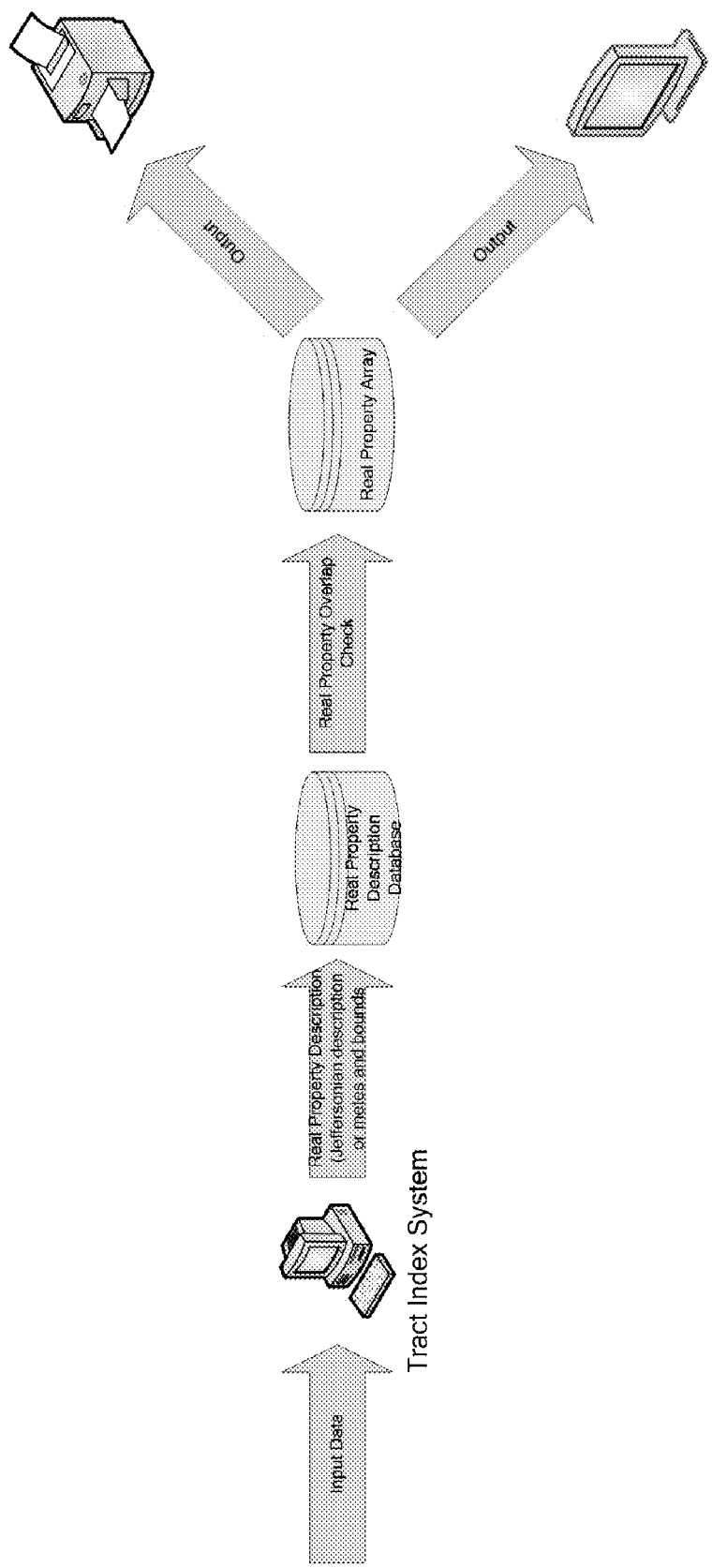
FIG. 1 shows an overview of the method described below concerning the instant invention.
Figure 2:
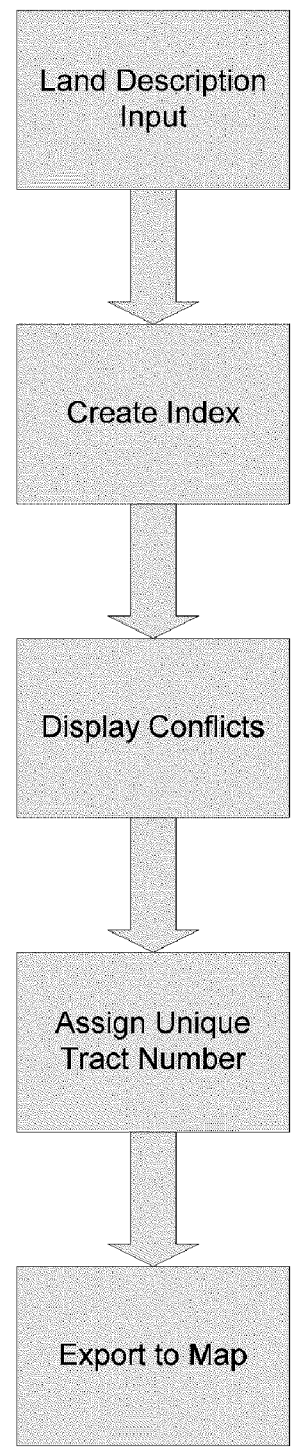
FIG. 2 is a flow chart showing an overview of the method described below concerning the instant invention.

The following definitions shall apply in connection to the discussion herein. However, the definitions below are designed to augment the ordinary, plain meaning definitions of the terms and to definitions known to those persons with ordinary skill in the art and are not presented to narrow the definitions.

The term "real property tracts" is broadly defined to include real property described in relation to a larger portion of real property. For example, the NE ¼ of a section is a real property tract of the larger real property tract comprised of the entire section of property.

The term "real property descriptions" is broadly defined to include descriptions of real property comprised of either Jeffersonian descriptions of property which includes the township and range number of the section of interest and the description of a smaller portion relative to section or a metes and bounds description. This definition of property descriptions includes other means of describing real property known to those persons with ordinary skill in the art.

"Indexing" is broadly defined to include the general process of relating real property descriptions with specific real property tracts. Indexing can be performed by electronic computers, but is not limited to electronic computers.

A "computerized database" is broadly defined to include a means of storing information including, but not limited to, storing information within the memory or storage medium of an electronic device or devices and, storing information on a computer-readable medium by an electronic device or devices.

An "array index representing interests in real property tracts" is broadly defined to include a two dimensional array representing the interests in a specified portion of real property. Each element or index of the two dimensional structure in turn represents an underlying array representing real property tracts in greater detail. Therefore in one embodiment of the instant invention implemented on a computer, when a specific element is clicked, or otherwise designated, the element can expand to display another array showing additional property interests in finer detail. In this embodiment the parent element represents 40 acres of land, and when opened, the 40 acres is represented by an array which each element of the array represented 2.5 acres of land.

A "visual display device" is broadly defined to include any device capable of displaying information including, but not limited to a CRT display, and LCD display, a printer, plotter, or any device that can display information from an electronic computer.

An "electronic computer" is broadly defined to include any device capable of manipulating textual or numeric information via electronic means. This definition includes, but is not limited to, mainframe computers, mini-computers, desktop computers, laptop computers, networked computer systems, palm computers, wearable computing devices.

A "computer-readable medium" is broadly defined to include any kind of electronic computer memory such as, but not limited to, floppy disks, conventional hard disks, CD-ROMs, CD-RAMs, DVD-ROMs, DVD-RAMs, Flash ROMS, nonvolatile ROM, RAM, USB Flash Drives.

Discussion

The overall purpose of the instant invention is to provide a method for persons working with real property to be able to readily identify parcels of real property that do and do not have conflicting interests in those parcels. For example, investors in property intending to exploit minerals on the property require that they have the appropriate rights in the underlying minerals and the ability to access the minerals through necessary surface rights. The instant invention allows such persons to readily ascertain whether such rights exist and whether their rights conflict with the rights of others.

The instant invention is a method of indexing and displaying interests in real property tracts comprising accepting input of real property descriptions, maintaining a database containing interests in real property descriptions, creating an array index representing interests in real property tracts where each index in the array index represents a tract of real property, indexing of the property descriptions in the database to the related indices in the array index, and controlling a visual display device to indicate conflicting and non-conflicting interests in real property tracts.

The method accepts input as the real property description, either through the U.S. Government Public Land Survey System designations (sometimes call the Jeffersonian land survey system) or via a metes and bounds property description. The instant invention then generates and maintains a database of the inputted property descriptions. This database can be maintained in various formats including on paper or other means interpretable by a person. In the preferred embodiment, the database is maintained via a computerized database means and is stored on a computer-readable medium.

Figure 3:
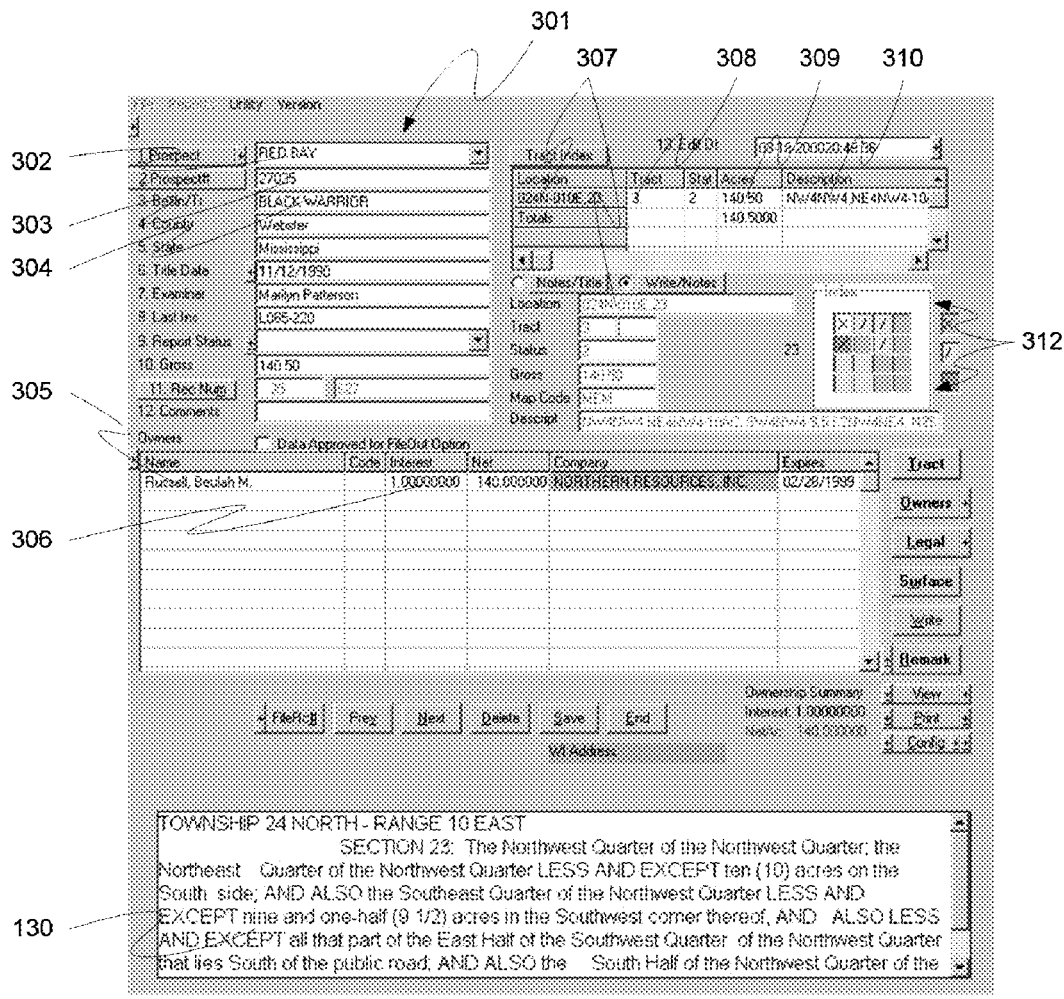
FIG. 3 shows one embodiment of the portion of the instant invention method of accepting real property descriptions, the generation of the array index, the method of accepting input concerning real property interest information, and the method of real property legal description notation.

The database contains all general property information, information required to describe the property such as legal description, and all information related to the use of the property. Individual property owner names are then related to the tract index for the purpose of organizing those owners according to common tract descriptions and type of ownership such as surface, timber, coal & other mineral interests. Referring to FIG. 3 which is one preferred embodiment of a visual display device of a computerized data input screen, information entered includes a subfield of general property information 301, with specific entries which include a prospect name 302, a prospect identification number 303, the geologic basin associated with the prospect 304, a property tract public land survey location 307, a tract number 308, acreage associated with the tract 309, a property description 310. Additional information entered comprises the name of owners of the land 305 and the percentage interest that the person has in the land 306, and a detailed legal description of the property 130.

The instant invention creates and maintains an array index which represents conflicting and non-conflicting property interests. The instant invention accepts the property description information and compares the information to determine whether more than one party has an interest in the property. The array index is updated to reflect any non-conflicting or conflicting property interests using unique symbols to represent both. One preferred embodiment of the array index is illustrated in FIG. 3 where the array index 312 is displayed on a visual display device computerized input screen. The array index 312 represents interests in real property tracts where each index in the array index represents a tract of real property. The interests in the real property are designed by specific symbols and colors (shown in grey scale in FIG. 3). For example, an "X" is present in an index in the array index 312 indicates that the location 307 has an interest in the complete tract. If all 16 indexes contained "X" then the prospect would have an interest in each of the 16 subtracts. As another example, a "/" present in an index the array index 312 indicates that the prospect has a partial interest in that portion if the tract. Further, a "." present in an index the array index 312 indicates that the prospect has a partial interest in a portion of the tract described via a metes and bounds property description. Other symbols may be used to describe full, partial and metes and bounds descriptions as necessary, and other symbols may be used to describe other interests in the real property.

The color of the indices in the array index 312 is also used to indicate real property interests. In one embodiment, a grey color for an index indicates that portion of the real property is in use or overlapped by another tract of the same location identifying a possible conflict. That is, that portion of the real property that is grayed out is completely or partially overlapped by another tract of the same location as an interest in the property. In this embodiment, yellow indicates that there is an interest in part of the underlying interest. Further exploration of the property can be made by selection of the yellowed index thereby opening a child array index to determine which smaller portions of the real property are included in the location as an interest. A green index in this embodiment indicates that there is a metes and bounds description of a sub-tract of the underlying property. Again, further exploration can be made by selecting that index and opening the child array index. This child index can also represent an additional child index. In general, there are a plurality of child indices and a plurality of child index layers as is required to completely specify property ownership to the level of detailed required by the application.

Figure 4:
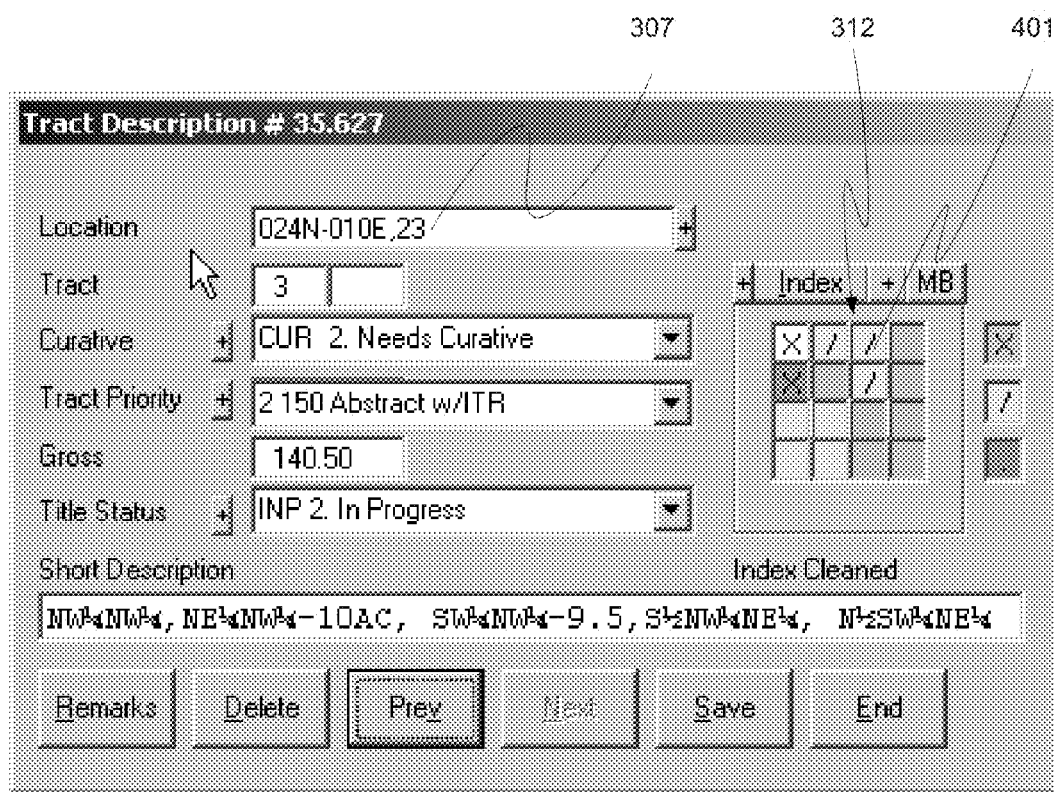
FIG. 4 shows one embodiment of the portion of the instant invention method of accepting real property descriptions and the generation of the array index.
Figure 5:
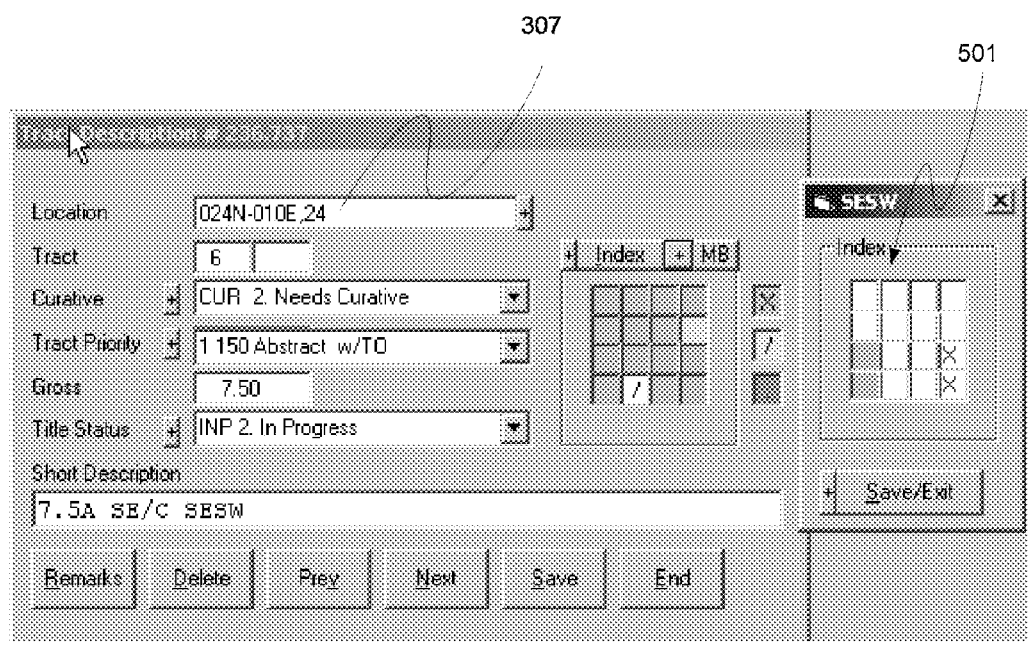
FIG. 5 shows one embodiment of the portion of the instant invention method of accepting real property descriptions and the generation of the array index for a child-level portion of real property.

Referring to FIG. 4, which is an enlargement of the array index 312 portion of FIG. 3, the parent-level array index 312 contains sixteen sub-indices 401. Each sub-index 401 is connected via the database to a child level array index 501 as exemplified in FIG. 5. Now the child level array index 501 shows conflicting and non-conflicting interests in the smaller portions of the land underlying the parent sub-indices 401. The instant invention relates the property descriptions in the database to the appropriate indices in the array index. As real property is included in the database, the instant invention updates the array index to reflect the additional property interests. Therefore, the instant invention provides a comprehensive and current view of the interests in the real property.

Figure 6:
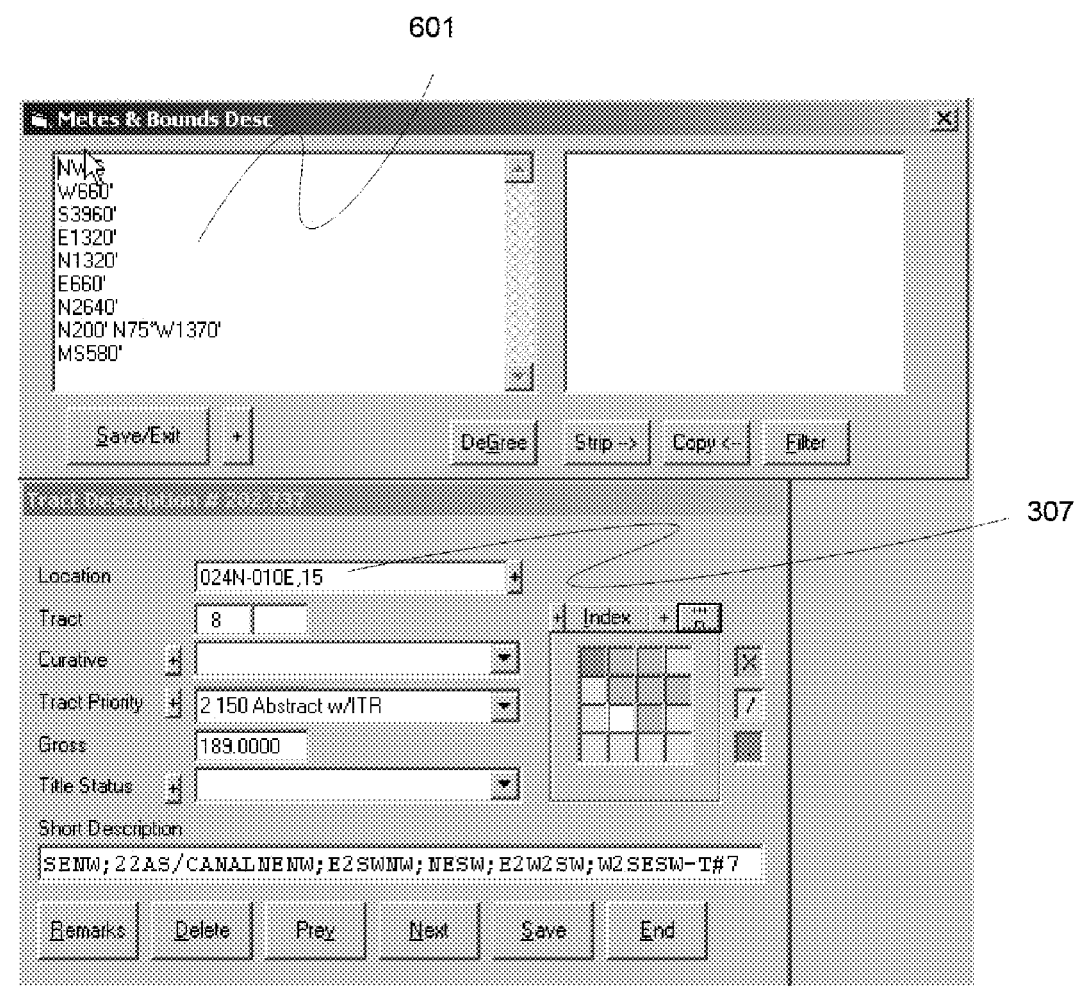

Legal property descriptions can be described as and inputted using either Jeffersonian or metes and bounds property descriptions. Briefly, Jeffersonian property descriptions, also termed as the U.S. Pubic Land Survey system, describe property relative to an east-west base line and north-south meridian line. Tracts of land are described by their distance east or west from the meridian line by township number and north and south of the base line by range number. Metes and bounds descriptions are given by their distance and direction from a monument on the property and from subsequent way points until a closed boundary of the property is formed. Other legal property descriptions are used throughout the U.S. and world. The instant invention can accommodate metes and bounds descriptions as exemplified in FIG. 6. The instant invention also accepts the full textual legal metes and bounds descriptions which are in turn translated to brief land calls. The brief land calls 130 of the property can be accepted and included in the project.

Figure 7:
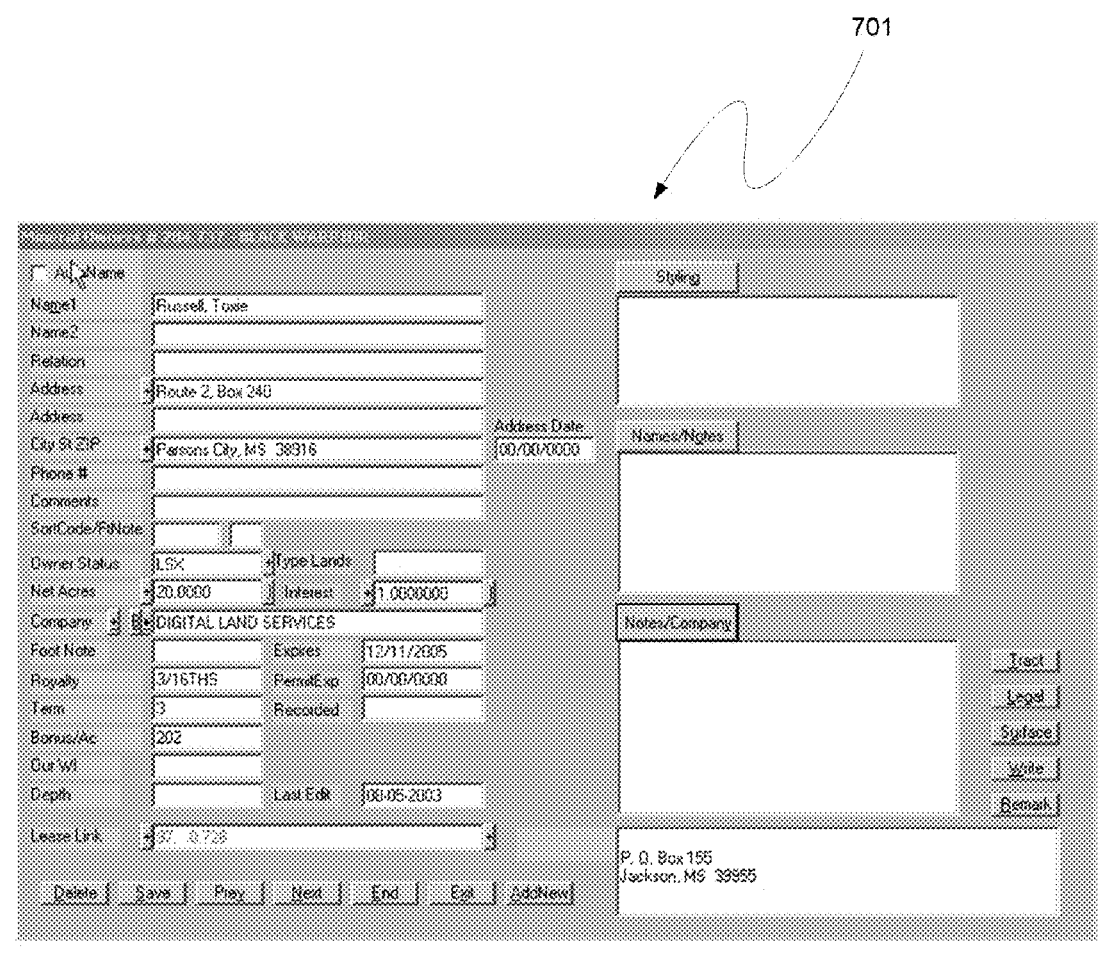
Figure 8:
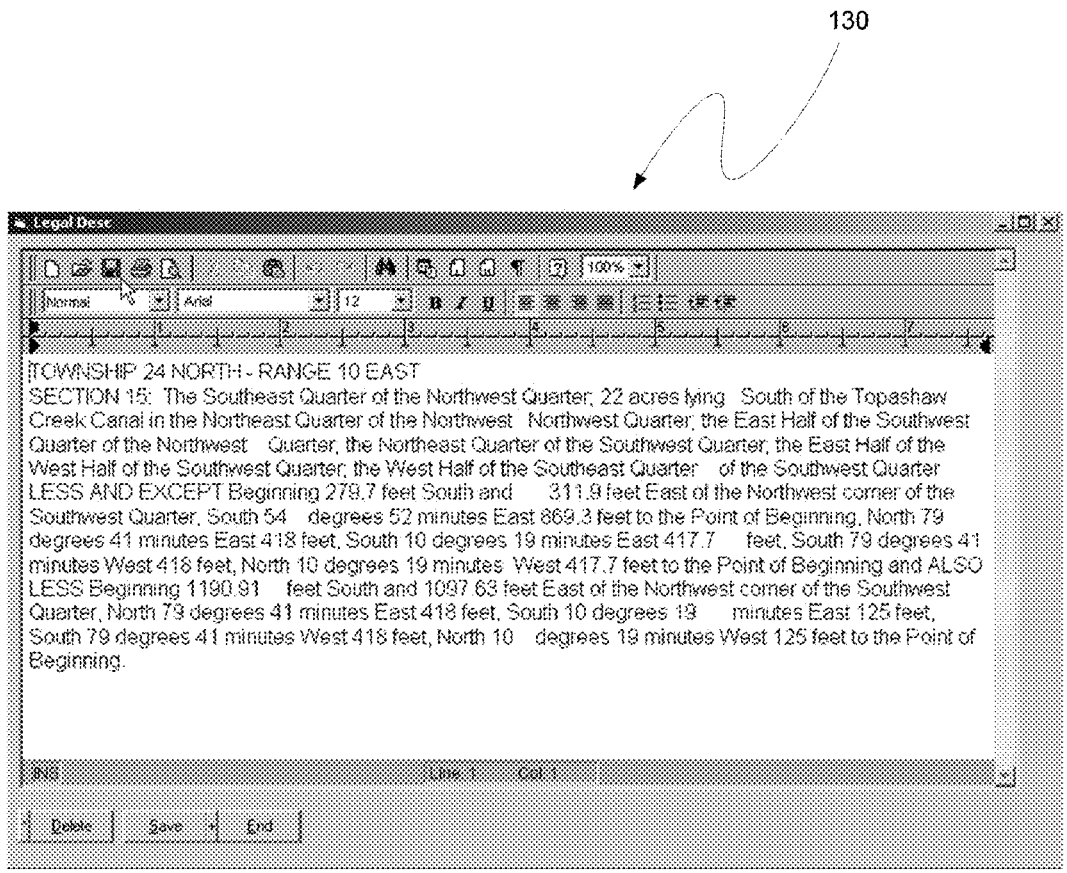
FIG. 8 shows one embodiment of the portion of the instant invention method of accepting the real property legal description information.

Mineral ownership information 701 as exemplified in FIG. 7 is included in the project. Detailed legal description input 801 is also included as exemplified in FIG. 8, and surface ownership information 901 as exemplified in FIG. 9.

Figure 10:
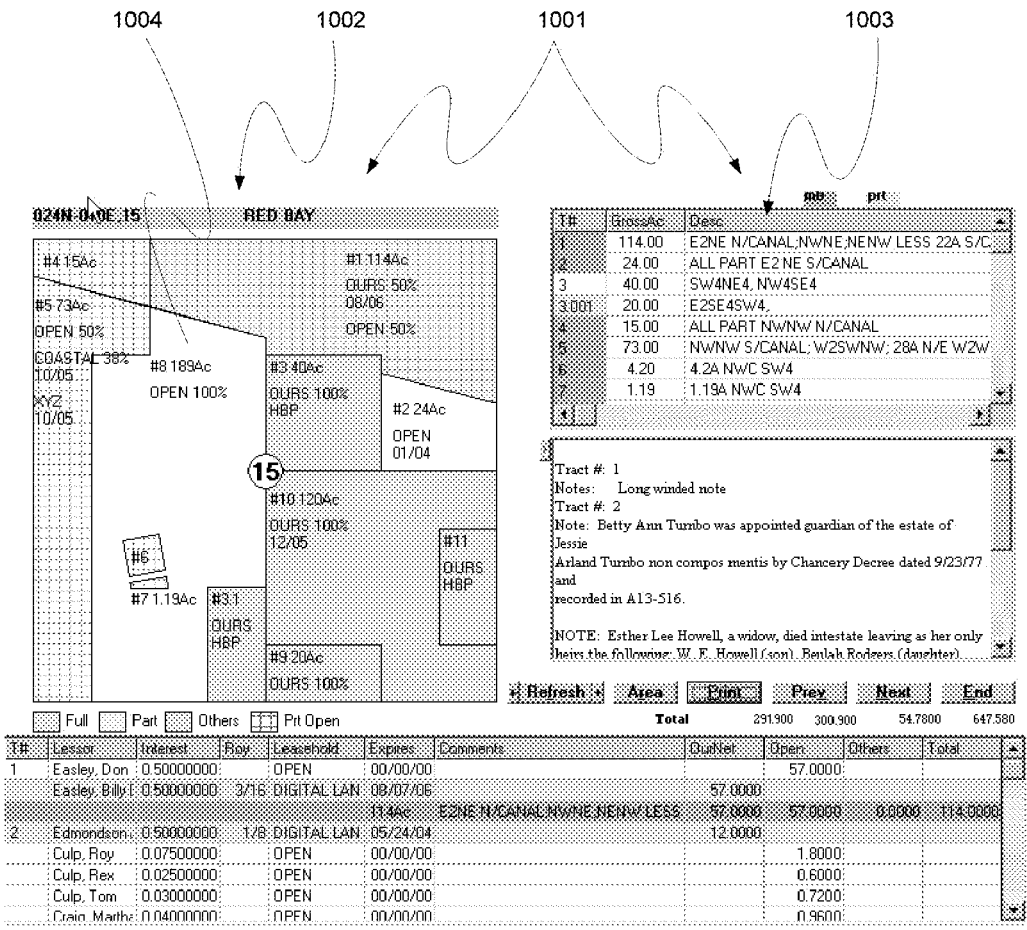
FIG. 10 shows one embodiment of the portion of the instant invention method of controlling a visual display device to indicate interests and conflicting interests in real property using unique symbols. Here is an example of output showing a map of the property tracts of interest showing all of the competing and non-competing property interests.

All of the accepted information can be summarized on a map output 1001 as exemplified in FIG. 10. An overall tract map 1002 displays the contours and short descriptive names via sub-tracts maps 1004. A written description of each sub-tract is also provided in the sub-tract listing 1003.

The instant invention may alternatively be viewed as a computer-readable medium having stored on the computer readable medium a data structure. This data structure is comprised of a data field containing a legal description of real property, a data field containing ownership information of the real property including mineral and surface interests, a data field containing property tracts or portions of property tracts with conflicting interests. In addition, an index field is created based on the values of these data fields. The index field is comprised of a data field containing a top-level index, and a plurality of child-level index fields, where the top-level index field and each child-level index field are selectable to access a child level index field.

The preferred embodiment of the instant invention which also encompasses the best mode of practicing the invention involves implementing the methods as outlined above and implemented on an electronic computer. The instant invention may be implemented on an electronic computer through a variety of programming means, but in the best mode of operation the instant invention is implemented via a standard BASIC computer language. Therefore, the database described in the instant invention above will be a computerized database. Further in the best mode of operation of the invention, the visual display device is a printer or a computer display.

What is claimed is:

1. A computer-readable medium having computer-executable instructions for performing a method of indexing and displaying interests in real property tracts comprising:
   accepting input of real property descriptions;
   accepting input of real property interests;
   maintaining a database containing interests in real property descriptions;
   creating an array index representing interests in real property tracts where each index in the array index represents a tract of real property, wherein the array index is comprised of
      a first field containing a legal description of real property;
      a second field containing ownership information of the real property including mineral and surface interests; and
      a third field containing property tracts or portions of property tracts with conflicting interests;
      a fourth field containing a prospect name;
      a fifth field containing a prospect identification number;
   indexing of the property descriptions in the database to the related indices in the array index; and
   controlling a visual display device to indicate conflicting and non-conflicting interests in real property tracts;
   wherein the information in the array index is compared to determine whether more than one party has an interest in the property;
   wherein the array index is updated to reflect any non-conflicting or conflicting property interests using unique symbols to represent both non-conflicting or conflicting property interests
   wherein the visual display device is updated with different symbols to reflect a complete or partial interest in the tract;
   wherein the visual display device is updated with different colors to reflect a conflict in the tract.

2. The computer-readable medium having computer-executable instructions for performing a method of indexing and displaying interests in real property tracts described in claim 1 wherein
   the database is a computerized database,
   the index is further comprised of
      a top-level index, and
      a plurality of child-level indices,
   where the top-level index and each child-level index is selectable to access a child level index, and
   the visual display device is a printer or a computer display.

3. The computer-readable medium having computer-executable instructions for performing a method of indexing and displaying interests in real property tracts described in claim 2 where
   the visual display device visually displays conflicting and non-conflicting interests in the real property using symbols and maps,
   the real property descriptions are Jeffersonian descriptions or full textual legal metes and bounds descriptions, and
   the full textual legal metes and bounds descriptions are translated to brief land calls.

4. A computer-readable medium having computer-executable instructions for performing a method of indexing and displaying interests in real property tracts consisting of:
   accepting input of real property description;
   accepting input of real property interests;
   maintaining a database containing interests in real property descriptions;
   creating an array index representing interests in real property tracts where each index in the array index represents a tract of real property, wherein the array index is comprised of
      a first field containing a legal description of real property;
      a second field containing ownership information of the real property including mineral and surface interests; and
      a third field containing property tracts or portions of property tracts with conflicting interests;
      a fourth field containing a prospect name;
      a fifth field containing a prospect identification number;
   indexing of the property descriptions in the database to the related indices in the array index; and
   controlling a visual display device to indicate conflicting and non-conflicting interests in real property tracts;
   wherein the information in the array index is compared to determine whether more than one party has an interest in the property thereby determining conflicting interests;
   wherein the array index is updated to reflect any non-conflicting or conflicting property interests using unique symbols to represent both non-conflicting or conflicting property interests.

5. The computer-readable medium having computer-executable instructions for performing a method of indexing and displaying interests in real property tracts described in claim 4 wherein
   the database is a computerized database,
   the index is further comprised of
      a top-level index, and
      a plurality of child-level indices,
   where the top-level index and each child-level index is selectable to access a child level index, and
   the visual display device is a printer or a computer display.

6. The computer-readable medium having computer-executable instructions for performing a method of indexing and displaying interests in real property tracts described in claim 5 where
   the visual display device visually displays conflicting and non-conflicting interests in the real property using symbols and maps,
   the real property descriptions are Jeffersonian descriptions or full textual legal metes and bounds descriptions, and
   the full textual legal metes and bounds descriptions are translated to brief land calls.

* * * * *